Mar. 13, 1923.
E. M. BOUTON
1,448,382
MOTOR CONTROL SYSTEM
Filed Dec. 14, 1920
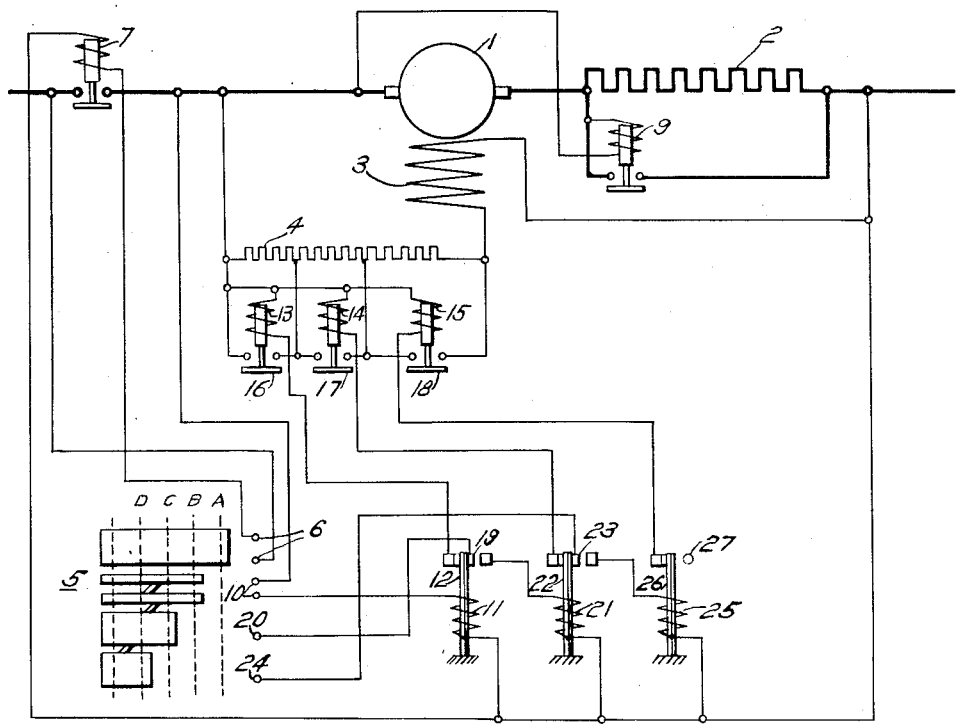
WITNESSES:
INVENTOR
Edgar M. Bouton
BY
ATTORNEY Patented Mar. 13, 1923.

1,448,382

UNITED STATES PATENT OFFICE.

EDGAR M. BOUTON, OF EAST PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed December 14, 1920. Serial No. 430,668.

*To all whom it may concern:*

Be it known that I, EDGAR M. BOUTON, a citizen of the United States, and a resident of East Pittsburgh, in the county of Allegheny and State of Pennsylvania, have invented a new and useful Improvement in Motor-Control Systems, of which the following is a specification.

My invention relates to motor-control systems and it has special relation to such systems wherein adjustable-speed motors are employed.

In motors of the above-designated type, it is desirable to effect the gradual acceleration of the speed of the motor by successively inserting sections of the field resistor in series relation with the field-magnet winding, at predetermined regulated intervals.

One object of my invention is to provide a thermal system for controlling the insertion of sections of the field resistor, thereby suitably governing the acceleration of the motor and preventing the operator from weakening the field too rapidly.

Another object of my invention is to so place the thermostatic devices in circuit with the controller that the running speed of the motor, at any instant, will depend upon the position of the controller. On the other hand, no matter how rapidly the controller may be moved to any operating position, the acceleration of the motor to the desired speed will depend upon the successive operation of the time-element thermal devices that are energized.

My invention may best be understood by reference to the accompanying drawing, the single figure of which is a diagrammatic view of the organization of circuits and apparatus of one embodiment of my invention.

The motor 1, having a shunt-field-magnet winding 3 and a field resistor 4, together with a starting resistor 2, is energized, when controller 5 is moved to its first position, designated by the letter A, to bridge stationary contact members or fingers 6. This movement effects the closure of the main-line contactor 7.

Immediately upon the closure of the contactor 7, a circuit is completed through the coils 13, 14 and 15 of the electromagnetic switches 16, 17 and 18, thereby closing these switches and shunting the field resistor.

In accordance with the usual practice, the starting resistor 2 is adapted to be shunted, after the motor has come up to speed, through the agency of the electromagnetic switch 9.

Upon moving the controller 5 to its second position, designated by the letter B, it will bridge control fingers 10, thereby completing a circuit to the high-resistance coil 11 of the thermal relay 12.

This action will cause the coil 11 to heat and, after a predetermined time, cause the thermal relay 12 to move or open, which will, in turn, de-energize the coil 13 and open switch 16, thereby inserting the first section of the field resistor into circuit with the field-magnet winding. This same movement of the thermal relay 12 will close the switch 19, which is located between the first and second thermal relays. The part of the switch 19 that is mounted upon the relay 12 is insulated therefrom and is in circuit with the next succeeding control finger 20 of the controller 5.

Upon moving the controller 5 to its third position, designated by the letter C, it will establish a circuit through control finger 20 by means of the connected segments of the controller and the closed switch 19 to complete a circuit through high-resistance coil 21 of thermal relay 22. As soon as coil 21 has heated sufficiently, it will cause the movement of the relay 22 to open the circuit through coil 14, de-energizing it and opening switch 17 to connect the second portion of the field resistor in series relation with the field-magnet winding. This same movement of the relay 22 will close switch 23, having the same connections as, and to effect similar results to, those heretofore explained with reference to switch 19.

Upon movement of the controller 5 to its fourth position, designated by the letter D, it will close a circuit through control finger 24 and the closed switch 23 to the high-resistance coil 25 of thermal relay 26. After the coil 25 is heated sufficiently, the relay 26 will open and rest against a stop 27. This action will open the circuit to, and de-energize, coil 15 to open the switch 18 and throw the reminder of the field resistor in series relation with the field-magnet winding. The motor will then reach its highest point of acceleration.

The deceleration of the motor may also be controlled by the use of the time-element feature that is provided by the thermal relays 12, 22 and 26, to operate the system in inverse order. That is, if the time of resetting of relay 26 is arranged to be less than that of relay 22, and that of relay 22 less than that of relay 12, the deceleration will be as gradual, comparatively speaking, as the acceleration. This statement will be true whether the controller is thrown to its "off" position in one movement or is returned step-by-step. It will be understood that the time element may be regulated either by providing different characteristics for the coils 11, 21 and 25 or by using different heat-responsive materials in the relays 12, 22 and 26.

My invention thus comprises a motor, together with accelerating means, thermostatic devices, preferably thermal relays, in series with said accelerating means, and an interposed controller in circuit with said thermal relays so that the motor cannot be accelerated beyond a predetermined speed. However, where the operator throws the controller to full "on" position, the motor will, nevertheless, be accelerated gradually, owing to the fact that the de-energizing of the coil of the second switch in the accelerating circuit is dependent upon the previous movement of the first thermostatic device controlling the first switch; and the de-energizing of the coil of the third switch is dependent upon the previous movement of the second and first thermostatic devices; and so on, until the entire number of sections are inserted.

From the above description, it will be noted, primarily, that a complete thermostatic time-control of the acceleration of the motor is obtained. Secondly, this thermostatic control is so arranged that the motor cannot be accelerated beyond a predetermined point; nor can it be accelerated at all until the controller is moved to a position to energize coil 11 of the first thermal relay. Thirdly, the operator cannot accelerate the motor too rapidly, because, no matter how rapidly he may turn the controller, the second portion of the field resistor cannot be inserted until switch 19 is closed, and this can be done only by a movement of the thermal relay 12, which will take place only after control fingers 10 are bridged. Similarly, the remaining portions of the field resistor cannot be inserted until the remaining thermal relays have successively interrupted the circuits through their respective coils and simultaneously close the switches located between the controller and the next succeeding relay coils.

The advantages of the above system are many, particularly when such a control system is used in connection with elevators and devices requiring similar control. In such cases, the acceleration of the operating motor will be entirely automatic and, no matter what the operator may do, he cannot force undue acceleration.

I do not wish to be restricted to the specific circuit connections or arrangements of parts herein set forth, as various modifications thereof may be made without departing from the spirit and scope of my invention. I desire, therefore, that only such limitations shall be imposed as are indicated by the appended claims.

I claim as my invention:—

1. The combination with a motor having a shunt field-magnet winding, a field resistor, and a plurality of switches in a shunt circuit for said resistor, each adapted to insert a portion of said resistor in series relation with said winding, of manually operable means for controlling the operation of said switches and thermostatic means for controlling the effect of manual operations.

2. The combination with a motor having a shunt field-magnet winding and a field resistor having a plurality of switches in a shunt circuit for said resistor, of a thermal relay in circuit with each switch, the operation of each switch depending upon the operation of the preceding relay.

3. The combination with a motor having a shunt field-magnet winding and a field resistor having a plurality of electromagnetic switches in a shunt circuit therefor, of a thermal relay for each of said switches, and means whereby the operation of one relay de-energizes the coil of its respective electromagnetic switch and energizes the next succeeding relay.

4. The combination with a motor having a shunt field-magnet winding and a divided field resistor, of control means for inserting the divisions of the field resistor in circuit with said winding at predetermined intervals, said means comprising a thermostatic device.

5. The combination with a motor having a shunt field-magnet winding, a field resistor and a controller, of thermostatic means for controlling the insertion of said resistor, said means being in circuit with said controller, said means being operative only to the extent said controller has been moved.

6. The combination with a motor having a shunt field-magnet winding, a field resistor having a plurality of switches in a shunt circuit therefor, and a controller, of thermostatic means in series relation with each of said switches and in circuit with said controller.

7. In a motor-control system, the combination of a motor having a shunt field-magnet winding, a field resistor, a plurality of switches in a shunt circuit therefor, a thermal relay in series relation with each switch, and means for preventing the operation of the respective relays until a predetermined condition exists.

8. The combination with a motor having a shunt field-magnet winding and means for accelerating the speed of the motor, of thermal means for controlling said acceleration, and means for preventing the acceleration of the motor beyond a predetermined speed.

9. The combination with a motor and means for controlling the speed thereof, of thermostatic means for controlling said means to effect deceleration of the motor.

10. The combination with a motor and means for controlling the speed thereof, of thermostatic devices for controlling said means, and means for determining the sequence of operation of said devices during acceleration and deceleration of the motor.

11. The combination with a motor and a plurality of switches for controlling the speed thereof, of thermal means for controlling said switches, and means for selectively controlling the operation of the thermal means.

12. The combination with a motor and means for accelerating the speed thereof, of thermal means for controlling said acceleration, and means for preventing the acceleration of the motor beyond a predetermined speed.

13. The combination with a motor and means for accelerating the speed thereof, including a controller, of thermal means in circuit with said accelerating means, and also with said controller, for regulating said acceleration.

14. The combination with a motor and means for accelerating the speed thereof including a controller, of a thermal device in series relation with said accelerating means and governed by said controller.

15. The combination with a motor having a shunt field-magnet winding and a field resistor, of thermostatic time-element means for successively inserting portions of said resistor in series relation with said winding to accelerate the speed of the motor, said thermostatic means being utilized also as a time-element device during deceleration of the motor to shunt the portions of said resistor in inverse order.

In testimony whereof, I have hereunto subscribed my name this 3rd day of December, 1920.

EDGAR M. BOUTON.